United States Patent
O'Haire

(10) Patent No.: US 8,994,501 B2
(45) Date of Patent: Mar. 31, 2015

(54) METHOD AND APPARATUS FOR READING RADIO FREQUENCY IDENTIFICATION TAGS WITH LOWEST POWER CONSUMPTION

(75) Inventor: Michael O'Haire, Smithtown, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 372 days.

(21) Appl. No.: 13/329,366

(22) Filed: Dec. 19, 2011

(65) Prior Publication Data

US 2013/0154801 A1 Jun. 20, 2013

(51) Int. Cl.
*G06K 7/01* (2006.01)
*G06K 7/10* (2006.01)

(52) U.S. Cl.
CPC ........ *G06K 7/10009* (2013.01); *G06K 7/10118* (2013.01); *G06K 7/10158* (2013.01)
USPC ....... 340/10.1; 340/10.2; 340/10.3; 340/5.61; 340/572.1

(58) Field of Classification Search
CPC .......... G06K 7/10009; G06K 7/10118; G06K 7/10158; G06K 7/0008; G06K 7/10029; G06K 7/10356
USPC .............................. 340/10.1, 10.2, 10.3, 5.61
See application file for complete search history.

(56) References Cited

U.S. PATENT DOCUMENTS

| | | | |
|---|---|---|---|
| 8,237,546 B2 * | 8/2012 | Bekritsky et al. | 340/10.1 |
| 2004/0036575 A1 * | 2/2004 | Patterson et al. | 340/10.3 |
| 2007/0018793 A1 * | 1/2007 | Stewart et al. | 340/10.3 |
| 2011/0050400 A1 * | 3/2011 | Ho et al. | 340/10.42 |

OTHER PUBLICATIONS

Christopher Gordon Gervase Turner, Interrogator with variable maximum output power, Sep. 1999, EP0944015A2 (English Translation).*

* cited by examiner

*Primary Examiner* — Brian Zimmerman
*Assistant Examiner* — Bhavin M Patel

(57) ABSTRACT

A method and apparatus for selectively reading radio frequency identification device (RFID) tags by an RFID reader includes the RFID reader transmitting an interrogation signal at each of a plurality of power levels beginning with a lowest power level and sequentially increasing power of the transmitted interrogation signal to a highest power level. The RFID reader receives, in response to transmitting the interrogation for at least one of the power levels, at least one data signal from each RFID tag within a read zone of the RFID reader, wherein each of the data signals contains stored data corresponding to the RFID tag responding to the transmission of the interrogation signal. The RFID reader selectively reads the stored data contained in the data signals received from the responding RFID tags.

16 Claims, 5 Drawing Sheets

METHOD AND APPARATUS FOR READING RADIO FREQUENCY IDENTIFICATION TAGS WITH LOWEST POWER CONSUMPTION

FIELD OF THE DISCLOSURE

The present disclosure relates generally to radio frequency identification devices and more particularly to selectively reading radio frequency identification devices to consume less power.

BACKGROUND

Radio Frequency Identification (RFID) tags are devices that allow tracking of items to which they are attached. RFID tags may be monitored wirelessly by devices using radio frequency signals, and the RFID tags are typically interrogated by a radio frequency device using a frequency that is compatible with that individual RFID tag. One common device used to interrogate and read RFID tags are RFID readers. RFID readers gather information from RFID tags by transmitting interrogation and command signals within a read zone. These interrogation and command signals cause the RFID tags to respond with desired information. The RFID tags are either passive or active. Active RFID tags have their own power source. Passive RFID tags derive power from signals that originate from external sources. For example, an RFID reader sends an interrogation signal to a passive RFID tag, which the passive RFID tag uses to return data to the RFID reader. More particularly, the interrogation signal is sent on a time varying radio frequency wave that can be used by the passive RFID tag to generate sufficient power for that RFID tag to operate. Moreover, RFID readers can be fixed or mobile depending on the system in which they are being used.

There are currently numerous types of RFID tags. Certain types of RFID tags have control mechanisms contained within the tags. One of the various types of RFID tags that is currently marketed, referred to herein as Electronic Product Code (EPC) Generation (Gen) 2 RFID tags, provides mechanisms that may be set to provide control and functionality for the RFID tags. As used herein EPC Gen 2™ RFID tags refer to RFID tags that operate in compliance with one or more aspects of the EPC Gen 2 Class 1 Ultra High Frequency (UHF) standard published as amendment 18000-6C (originally in 2006 but including any subsequent revisions) to the International Standards Organization 18000-6 standard RFID interface for item management using devices operating in the 860-960 MHz Industrial, Scientific, and Medical band.

Numerous configurations for RFID readers are used to read the RFID tags. In some circumstances, the RFID readers receive power from a hardwired source. In other circumstances, the RFID readers employ batteries. The power level for reading used by RFID readers is typically presented in terms of decibels (dB). RFID readers need to establish communications with the RFID tags that they intend to read. Therefore, RFID readers that employ batteries require sufficient power to the signals supplied to their antennas to cause or enable responses from RFID tags. Thus, for those types of RFID readers that employ batteries, the battery life of the RFID reader is an important issue.

Accordingly, there is a need for a method and apparatus for reading RFID tags using the lowest power consumption.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
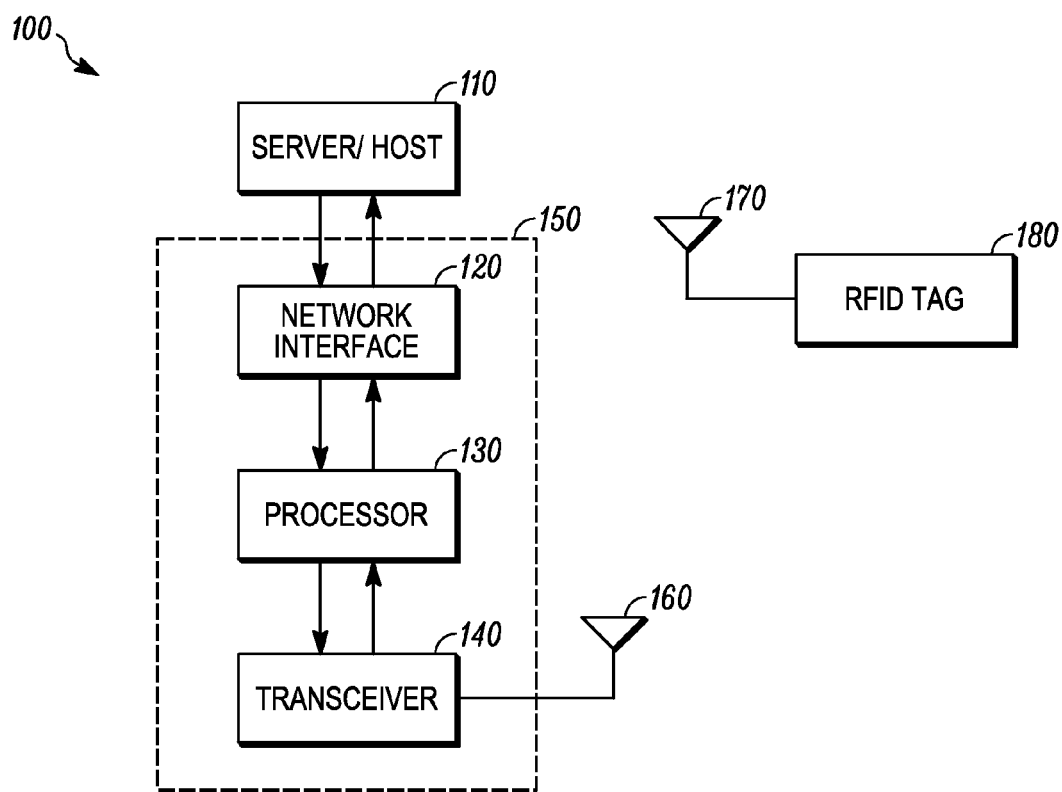
FIG. 1 is a block diagram illustrating a system for reading RFID tags in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments. In addition, the description and drawings do not necessarily require the order illustrated. It will be further appreciated that certain actions and/or steps may be described or depicted in a particular order of occurrence while those skilled in the art will understand that such specificity with respect to sequence is not actually required.

Apparatus and method components have been represented where appropriate by conventional symbols in the drawings, showing only those specific details that are pertinent to understanding the various embodiments so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

DETAILED DESCRIPTION

Generally speaking, pursuant to the various embodiments, the present disclosure provides a method and apparatus for an RFID reader to read RFID tags at a lowest power level. In accordance with the present teachings, a method is provided for selectively reading radio frequency identification device (RFID) tags by an RFID reader. The method includes: transmitting, by the RFID reader, an interrogation signal at each of a plurality of power levels beginning with a lowest power level and sequentially increasing power of the transmitted interrogation signal to a highest power level; receiving, in response to transmitting the interrogation signal for at least one of the power levels, at least one data signal from each RFID tag within a read zone of the RFID reader, wherein each of the data signals contains stored data corresponding to the RFID tag responding to the transmission of the interrogation signal; and selectively reading the stored data contained in the data signals received from the responding RFID tags.

Further in accordance with the present teachings, a radio frequency identification (RFID) tag reader includes: a transceiver configured to transmit an interrogation signal at a selected transmission power level and to receive responses from RFID tags in response to the interrogation signal; and a processor operatively coupled to the transceiver and configured to determine the selected transmission power level, wherein the selected transmission power level is sequentially increased from a lowest power level to a highest power level, and wherein the processor is further configured to perform a read algorithm at each selected transmission power level to read, at least once, responses from each of the RFID tags.

Further in accordance with the present teachings, a non-transient computer readable storage medium having computer-readable code stored thereon for programs a computer to perform a method for selectively reading radio frequency identification (RFID) tags. The method includes transmitting an interrogation signal at each of a plurality of power levels beginning with a lowest power level and sequentially increasing power of the transmitted interrogation signal to a highest power; receiving, in response to transmitting the interrogation signal for at least one of the power levels, at least one data signal from each RFID tag within a read zone of an RFID reader, wherein each of the data signals contain stored data corresponding to the RFID tag responding to the transmission of the interrogation signal; and selectively reading the stored data contained in the data signals received from the responding RFID tags.

Referring now to drawings and in particular FIG. 1, a block diagram shows an illustrative system 100 for reading RFID tags at the lowest power levels in accordance with some embodiments. The system 100 includes at least one RFID tag 180 (which can be passive or active); a server/host 110, and at least one RFID reader 150. In system 100, a plurality of RFID tags 180 are affixed to products or merchandise and configured to respond to a predetermined range of radio frequency waves. The Server/Host 110 may be provided with processing and storage capabilities to provide command and control capabilities for system 100.

In one embodiment, server/host 110 provides bidirectional communication capabilities with the RFID reader 150 through a network interface 120 allowing the server/host 110 to receive information from RFID readers 150 and to send command and control signals to the RFID readers. The network interface 120 can be either a hardwired interface or a wireless interface using, for instance, WiFi radio frequency communication. Moreover, there may be additional devices, such as access points (not shown), that are situated between the RFID readers 150 and the server/host 110. The discussion herein treats these potential access points as being similar to a local server/host 110 and the functionality described herein for server/host 110 could also be contained in an access point located between the server/host 110 and the RFID readers 150. In addition, an embodiment is imagined wherein the system 100 does not include the Server/Host 110.

The RFID readers 150 communicate with their respective RFID tags 180 using radio frequency waves. The RFID readers may also be configured to communicate with server/host 110 (or access points if existing) using acoustics (such as ultrasonics) used by system 100 for locating the RFID readers 150. The RFID reader 150 comprises the network interface 120 that interfaces with server/host 110, a processor 130 to provide control of command and interrogation signals sent to the RFID tags 180, a transceiver 140 to transmit the interrogation signals and commands using radio frequency waves as well as receive responses, and an antenna 160.

The antenna 160 on the RFID reader 150 enables radio frequency communication with the RFID tags 180 through an antenna 170 on the RFID tags. Only a limited number of RFID readers and RFID tags are shown for ease of illustration of system 100; but additional such elements may be included in the communication system 100. Moreover, other components needed for a commercial embodiment of the system 100, such as access points for facilitating communications between the RFID reader 150 and the server/host 110, are omitted from the drawing for clarity in describing the enclosed embodiments.

The RFID reader 150 transmits information to an RFID tag 180 by modulating the information onto a radio frequency signal within a particular frequency range. In one particular embodiment, EPC Gen 2™ RFID tags are employed by system 100 and the frequency range is 860-960 MHz. There are numerous types of RFID tags currently existing that can respond to frequency ranges as low as 1.3-13 KHz, and the embodiments disclosed here envision the RFID tags using both higher and lower frequency ranges. The "information" that the RFID reader sends to the RFID tag can be a command signal or instruction, for example to set a flag. The "information" could also be an interrogation signal, meaning a signal that causes the RFID tag to respond with a data signal containing stored data, for example an RFID tag identifier (ID) and/or a product code.

In an embodiment, the RFID tags 180 are passive meaning that they have no power source. These passive RFID tags 180 receive information and/or energy from a continuous wave radio frequency signal transmitted from the RFID reader 150. The RFID reader 150 receives information (e.g., the RFID tag ID and/or product code) from the RFID tags 180 on a reflection of the continuous wave radio frequency signal. More particularly, the RFID tag responds by modulating an information signal on the reflection of the continuous wave radio frequency signal, thereby backscattering the information signal to the RFID reader 150. The response from the RFID tag containing information (i.e., the information signal) is also referred to herein as a "data signal". In an embodiment, RFID readers 150 and RFID tags 180 communicate in half duplex, meaning that they do not simultaneously transmit. It should be noted that full duplex communication between RFID tags and RFID readers is also envisioned by the disclosed embodiments.

RFID tags 180 are read by radio frequency devices, such as RFID readers 150, at predetermined frequencies. The RFID tags 180 respond to these predetermined frequencies once a particular power level at the antenna 170 of the RFID tag 180 is reached. The power of radio frequency signals sent by the RFID readers 150 diminish the farther that an RFID tag 180 is from the RFID reader 150. Therefore, there are numerous power levels of radio frequency signals to which the RFID tag potentially responds. In an embodiment, a variety of output power levels are employed by the RFID reader 150 such that transmission power levels of 0-30 dB are evident at the antenna 160 of the RFID reader 150. Accordingly, in an embodiment, power at the antenna 160 of the RFID reader 150 varies between 0-30 dB in sending interrogation signals to the RFID tags 180. In one illustrative implementation, a low power level is on the order of 0-10 dB, a medium power level is around 10-20 dB and a high power level is about 20-30 dB. Additionally, intermediate power levels between low, medium and high could also be used to provide more discrete power levels.

The higher the output power level used by an RFID reader 150, the greater the distance that any particular RFID tag 180 can be from the RFID reader 150 and still be read; however, at a cost of shortening battery life for the RFID reader 150. Using radio frequency devices, such as RFID readers 150, at higher output power levels to read RFID tags 180 consumes more battery power than using lower power levels to read the RFID tags 180. The closer the RFID tag 180 to the RFID reader 150, the lower the output power level required of the RFID reader to read the RFID tag 180. By lowering the power level that is used by the RFID reader 150, less battery power is thus consumed.

In general, as used herein, the RFID reader 150, RFID tags 180, server/host 110, and other infrastructure devices within the system 100 (or their hardware) being "configured" or "adapted" means that such elements are implemented using one or more (although not all elements are shown) memory devices, network interfaces (e.g., network interface 120), and/or processing devices (e.g., processor 130) that are operatively coupled. These operatively coupled memory devices, network interfaces, and/or processing devices, when programmed, form the means for the corresponding system elements to implement their desired functionality, for example, as illustrated by reference to the methods shown in FIGS. 3-5.

The network interfaces (or simply interfaces) are used for passing signals also referred to herein as messaging or signaling (e.g., messages, packets, datagrams, frames, superframes, interrogation and command or instruction signals, data signals, and the like) containing RFID tag IDs, product codes, or other information between the elements of the system 100. The implementation of the network interface in any particular element depends on the particular type of network, i.e., wired and/or wireless, to which the element is connected and depends on any other devices to which a particular element is connected. For example, some embodiments may contain wireless interfaces, and other embodiments may contain wired interfaces that provide similar functionality.

Where the network and devices support wireless communications, the network interfaces comprise elements including processing, modulating, and transceiver (e.g., transceiver 140) elements that are operable in accordance with any one or more standard or proprietary wireless interfaces, wherein some of the functionality of the processing, modulating, and transceiver elements may be performed by means of the processing device through programmed logic such as software applications or firmware stored on the memory device of the system element or through hardware. Examples of wired interfaces include Ethernet, T1, USB interfaces, etc.

The processing devices utilized by the elements of system 100 may be partially implemented in hardware and, thereby, programmed with software or firmware logic or code for performing functionality described by reference to FIGS. 3-5; and/or the processing devices may be completely implemented in hardware, for example, as a state machine or ASIC (application specific integrated circuit). The memory implemented by these system elements can include short-term and/or long-term storage of various types of information needed for the functioning of the respective elements. The memory may further store software or firmware for programming the processing device with the logic or code needed to perform its functionality.

Figure 2:
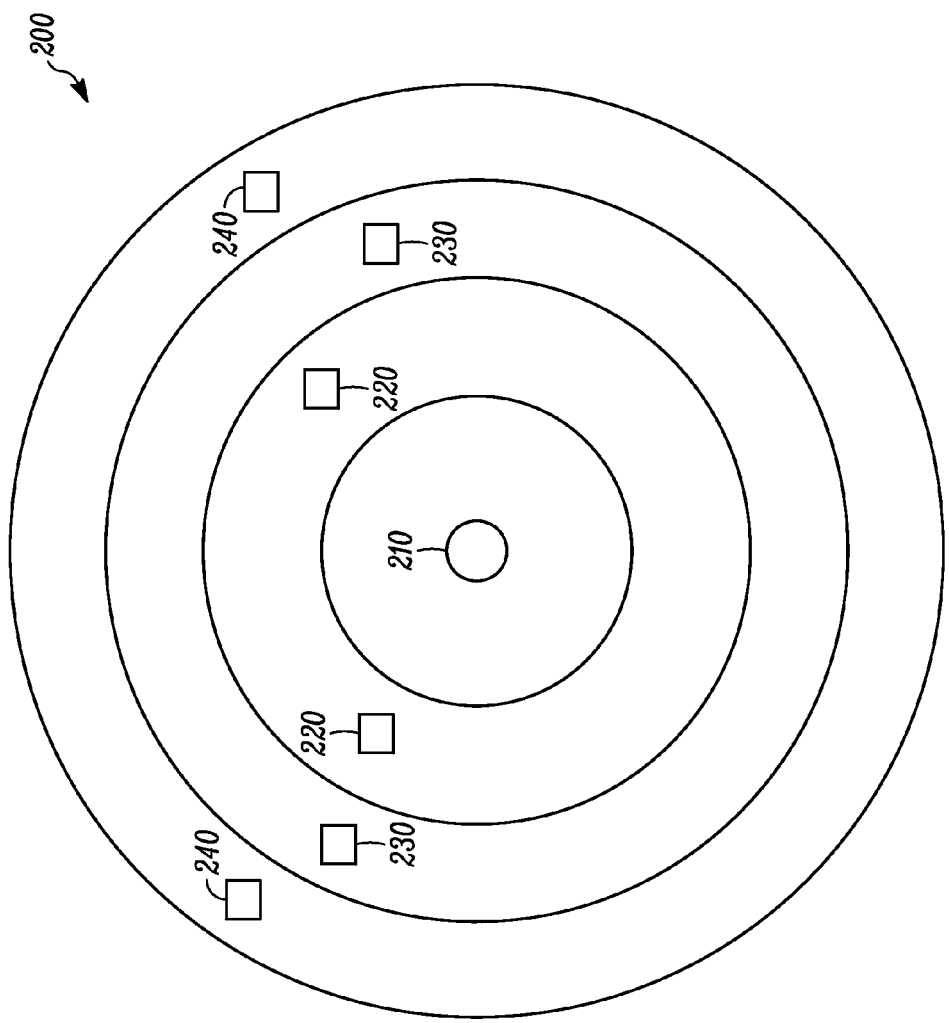
FIG. 2 is a diagram illustrating a read zone coverage area for an RFID reader and showing multiple RFID tags within the read zone coverage area that are interrogated by the RFID reader, in accordance with some embodiments.

Referring now to FIG. 2, an illustration of a zone coverage diagram 200 is shown that may be implemented using varying (i.e., a plurality of) power levels to send interrogation signals from the RFID reader 210 to a set (meaning one or more) of RFID tags. Zone coverage, read zone, read zone coverage, and interrogation zone are all interchangeably used herein to mean a spatial volume within which an RFID reader 150, or other radio frequency device having a transceiver or other transmission/reception capabilities, can send interrogation signals at a particular power level to RFID tags and receive responses.

Diagram 200 shows only a single RFID reader 210 used to read a respective set of RFID tags within groups 220, 230 and 240 within their respective read zone coverage of the RFID reader. However, embodiments are equally envisioned in which there are multiple RFID readers 210 each reading RFID tags within their respective read zones. Each of the circles or rings of diagram 200 that includes the groups 220, 230, and 240, respectively, represents a read zone for the RFID reader 210 at a different power level at which interrogation signal is transmitted. Each of the circles or rings of diagram 200 that includes the groups 220, 230, and 240, respectively, represents a spatial volume within which the RFID reader 210 can receive related information from the RFID tags in the groups depending on the transmission power level of the interrogation signal.

Each of these read zones may be determined, for example, by the sensitivity of the RFID tags to interrogation signals from RFID reader 210. Very often read zone coverage is in large part determined by the particular distances between the RFID reader to the RFID tags. However, read zone coverage can also be affected by ambient conditions such as lighting and electromagnetic interference or by additions to the system such as signal reflectors. Thus, in an embodiment, the read zone coverage of the set of RFID tags within tag groups 220, 230, and 240 is determined by the responsiveness of the RFID tags to signals and commands sent from the RFID reader 210 at a particular power level.

As RFID tag group 220 contains RFID tags within a specific distance from RFID reader 210, RFID tag group 220 is within a particular read zone around RFID reader 210. The read zone is determined by the responsiveness of the RFID tags within RFID tag group 220 to signals and commands sent from the RFID at a particular power level. In a similar manner, RFID tag group 230 contains RFID tags that are responsive within a particular read zone around RFID reader 210. The read zone for RFID tag group 230 is larger than the read zone for RFID tag group 220 indicating that the power level used to communicate with the RFID tags in RFID tag group 230 is higher than the power level used to communicate with the RFID tags in RFID tag group 220. Similarly, the tags within RFID tag group 240 require the RFID reader to use a higher power level to communicate with the RFID tags in that set.

Accordingly, the RFID reader 210 is capable of reading RFID tags at various power levels. RFID tags that are closer to the RFID reader typically require less power to read than those RFID tags that are farther away from the RFID reader. Therefore, the RFID reader 210 requires less power to read RFID tags 220 than either of RFID tags 230 or RFID tags 240.

Figure 3:
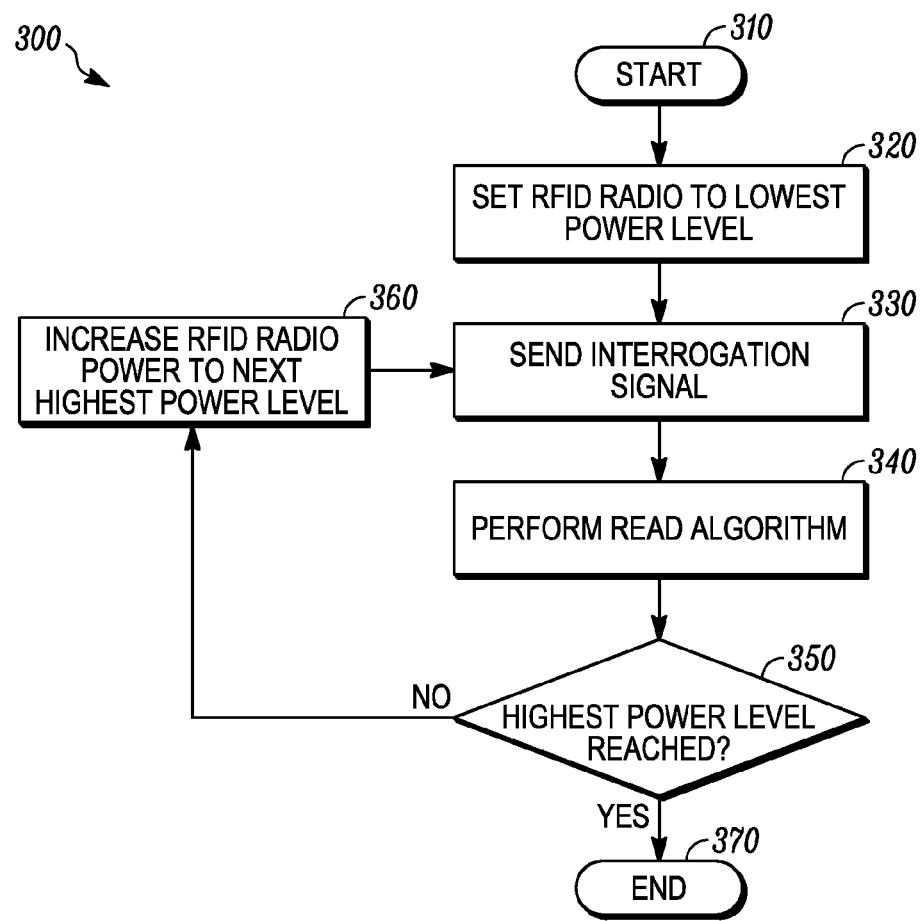
FIG. 3 is a flow diagram illustrating a method for interrogating RFID tags by an RFID reader in accordance with some embodiments.

FIG. 3 is a flow diagram 300 illustrating a method performed by an RFID reader in accordance with some embodiments. Method 300, in one illustrative implementation, operates within systems as shown in FIG. 1 and FIG. 2, for instance, with RFID reader 210 and RFID tags sets 220, 230 and 240 that are responsive within respective read zones around the RFID reader 210. Method 300 starts (310) either during a wake up time period, a reset or other type of initialization procedure. Operation proceeds to 320, wherein the RFID reader 210 sets a power level used to communicate with RFID tags (i.e., the transmission power level or the power level for transmitting an interrogation signal) to the lowest of multiple power levels that are available in the current configuration. In the illustrated embodiment, the RFID reader sets the transceiver (i.e., radio) used to send an interrogation signal to the lowest power level for its configuration. Example power levels are provided above. Each selected power level can be fixed (i.e., preconfigured) or adaptable depending on the particular RFID reader configuration. The lowest power level in this example may be sufficient to provide communication capabilities between the RFID reader 210 and some of the RFID tags of groups 220, 230 and 240 depending on the distance of the RFID tags from the RFID reader.

At 330, the RFID reader 210 sends an interrogation signal at that lowest power level. It is entirely possible that no RFID tags respond with a data signal to this transmission. It is also possible that at least some of the RFID tags do respond with a data signal. At 340, the RFID reader performs a read algorithm to read any response to the interrogation signal sent at the lowest power level. After reading any responses from the RFID tags, the RFID reader determines, at 350, if the power level at which the interrogation signal was previously sent is the highest of the multiple power levels. This is accomplished, for instance, by comparing the current power level that is used by the RFID reader 210 to communicate with RFID tags 220, 230 and 240 to the highest power level of the multiple power levels.

If the highest power level has not been reached, method 300 proceeds to 360, wherein the RFID reader increases its radio power level to the next highest of the multiple power levels. The RFID reader sends (330) another interrogation signal at the next highest power level and reads (340) any data signals that RFID tags send in response to the interrogation signal. The RFID reader continues to increase (360) its radio power level to the next highest level and read (340) all the tags at least once that respond to the interrogation signal sent (330) at that selected power level until it is determined at 350 that the highest of the multiple power levels is reached. Once the highest of the multiple power levels is reached, the flow diagram 300 ends, at 370.

Figure 4:
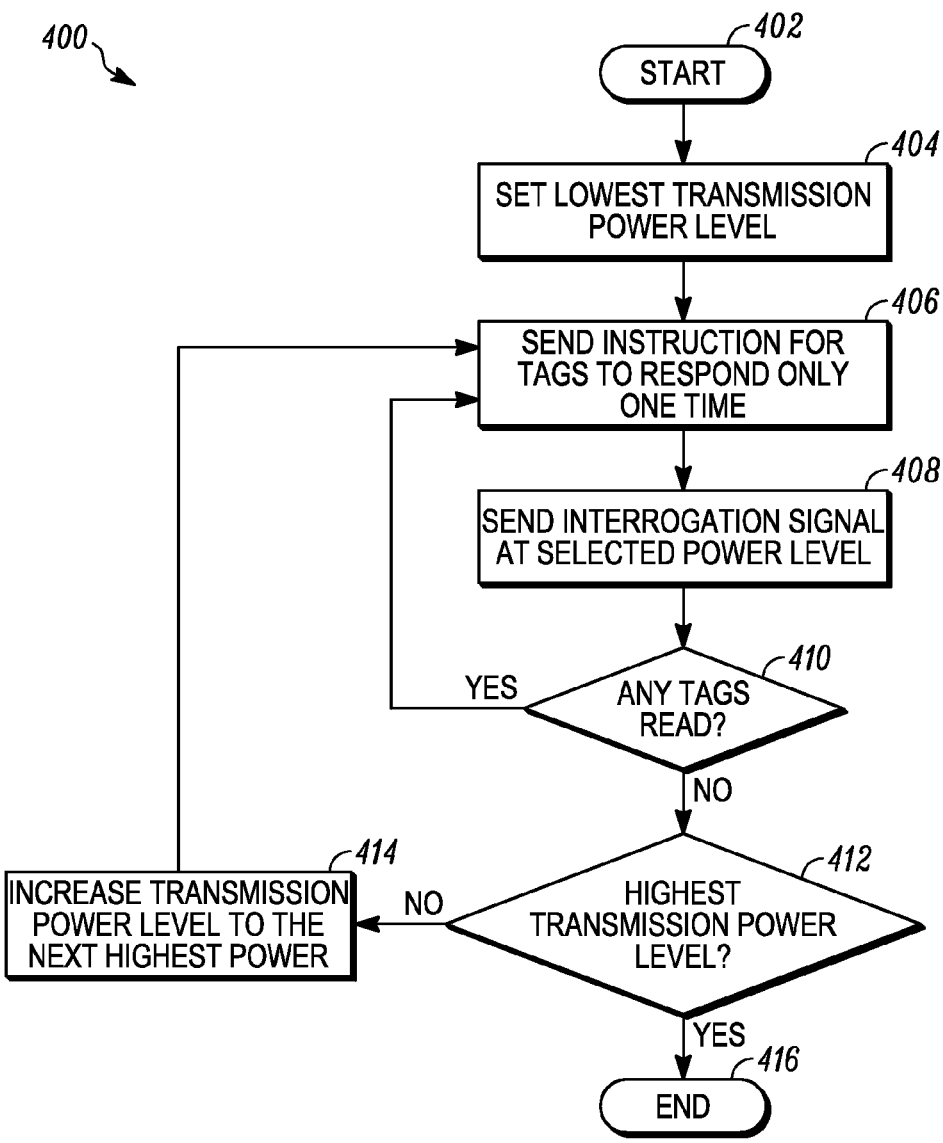
FIG. 4 is a flow diagram illustrating a method for interrogating RFID tags by an RFID reader in accordance with some embodiments.
Figure 5:
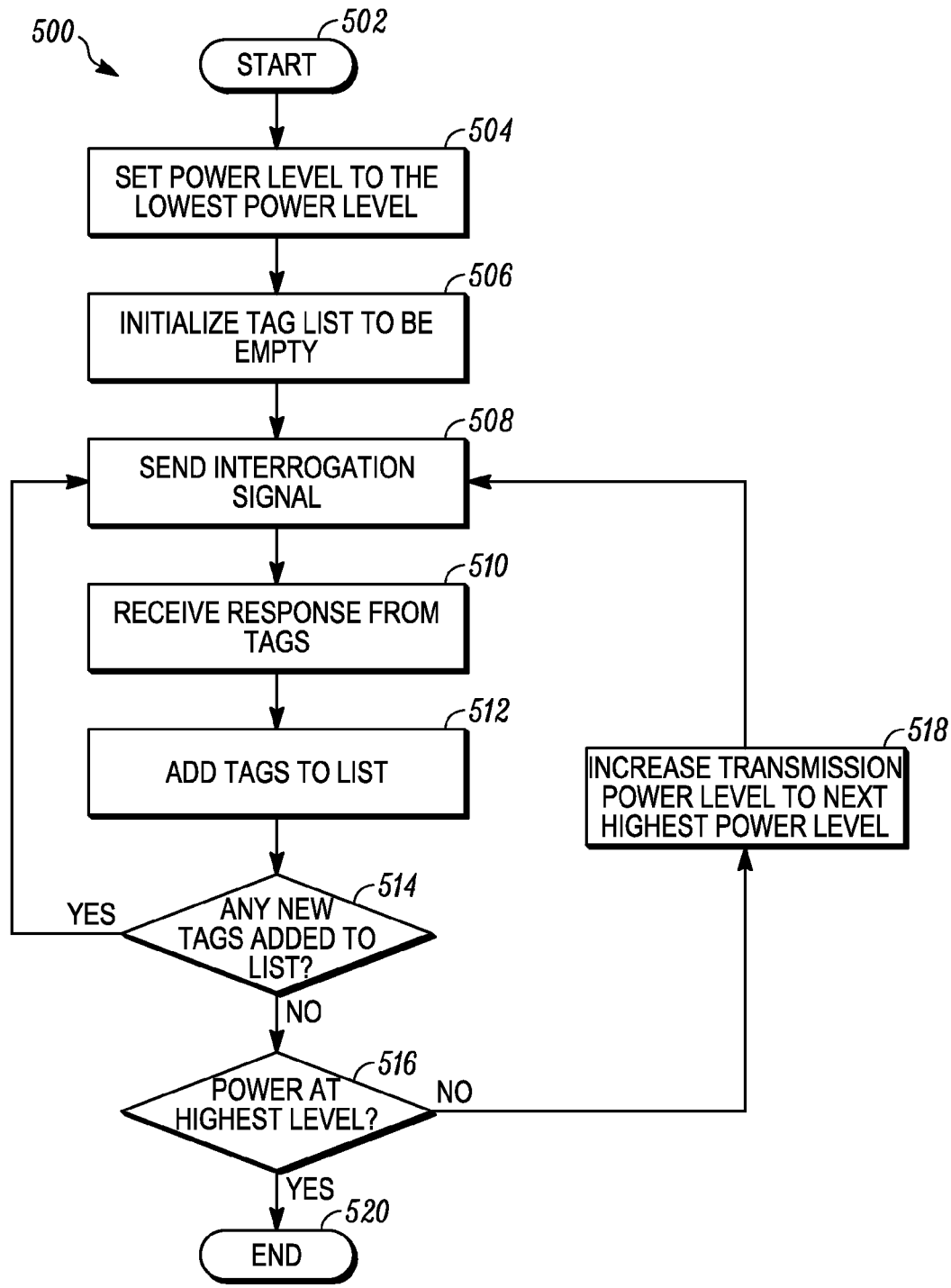
FIG. 5 is a flow diagram illustrating a method for interrogating RFID tags by an RFID reader in accordance with some embodiments.

In accordance with embodiments of the present teachings, as described for instance with respect to FIGS. 3-5, an RFID reader transmits an interrogation signal at each of a plurality of power levels beginning with a lowest power level and sequentially increases power of the transmitted interrogation signal to a highest power level. The RFID reader then "selectively reads" (by performing the read algorithm) stored data contained in data signals received from RFID tags in response to the interrogation signal. In one embodiment, selectively reading comprises reading the stored data for each of the responding RFID tags at only one of the power levels at which the interrogation signal is transmitted. In a further embodiment, the data signal for each RFID tag is received by the RFID reader in response to the interrogation signal at only one of the power levels, and selectively reading comprises reading the stored data from all of the responding RFID tags. FIGS. 3 and 4 illustrate further embodiment of the present teachings.

FIG. 4 is a flow diagram 400 illustrating a method performed by an RFID reader in accordance with an embodiment of the present disclosure. Method 400, in one illustrative implementation, operates within systems as shown in FIG. 1 and FIG. 2, for instance, with RFID reader 210 and RFID tags sets 220, 230 and 240 that are responsive within respective read zones around the RFID reader 210. Method 400 may start (402) either during a wake up time period, a reset or other initiation sequence. Operation proceeds to 404, wherein the RFID reader sets a transmission power level (used to transmit an interrogation signal) to a lowest of multiple transmission power levels that are available in the particular RFID reader configuration.

At 406, the RFID reader 210 sends an instruction to the RFID tags to respond only a single time to any interrogation signals that are detected. At 408, the RFID reader sends an interrogation signal to the RFID tags at the selected transmission power level, which is currently the lowest of multiple power levels. At 410, the RFID reader 210 determines if any responses (i.e., data signals) were received from RFID tags to the interrogation signal sent by the RFID reader 210 at the lowest power level.

If the RFID reader received data signals from RFID tags and read the corresponding stored data of the tags, method 400 returns to 406, wherein the RFID reader instructs the RFID tags to respond only one time to prevent subsequent responses from RFID tags who have already responded. Processing at 406, 408, and 410 repeats until the RFID reader fails to receive any responses and, thereby, reads no tags. In that case, at 412, a determination is made if the transmission power level is the highest of the multiple transmission power levels. If the transmission power level is not the highest transmission power level, the RFID reader selects (increases to) the next highest transmission power level and returns to processing at 406, wherein the foregoing sequence is repeated until the highest transmission power level is reached, wherein the method 400 ends, at 416.

In an embodiment, an approach similar to that of method 400 is performed using EPC Gen 2™ RFID tags, which allow the RFID reader to enable certain control functions. More particularly, the RFID reader can read a specific RFID tag one time and then place the tag into a state in which the tag can effectively not be read again. The RFID reader can also cause the tag to leave this state, and thus be readable again. The state is maintained using a bit or flag that resides in the RFID tag. The flag is referred to as the A/B flag, or the Selected/Not Selected flag. When an EPC Gen 2™ RFID tag is read, it responds to the RFID reader with a unique sequence of bits called the EPC Identification (ID). Each EPC Gen 2™ RFID tag has a unique ID, and no 2 tags are supposed to have the same ID. Thus, using this embodiment, for example, the RFID reader instructs the EPC Gen 2™ RFID tags to respond to the interrogation signal only once by commanding them to set an internal flag to control (i.e., cause) the RFID tag to respond to the interrogation signal with the data signal only once, thereby controlling the responsiveness of the RFID tag to the interrogation signal.

The present teachings can further utilize selection and query commands (also referred to herein as "Select/Query features") enabled through the use of EPC Gen 2™ RFID tags. In accordance with the present teachings, a "Select/Query" protocol is described and can be executed as many times as desired by the RFID reader. Each time this protocol is executed, an EPC Gen 2™ RFID tag can only respond one time to the RFID reader. The RFID reader can read the tag more than one time by executing the protocol more than one time. The RFID reader can, alternatively, utilize the Select/Query protocol in such a way that the tags don't respond more than once.

A Select/Query protocol, in accordance with the present teachings, using the Select/Query features of an EPC Gen 2™ RFID tag causes the RFID reader to: (1) set a lowest power mode; (2) use the EPC Gen 2™ protocol to instruct tags to respond only one time; (3) read the RFID tags in a read zone, and if any RFID tags are read, then go back to (2); and (4) if no tags are read, check to see if an increase in power level is possible, if so increase the power level and return to (2) and if already at the highest power level, the approach is finished. Thus, using this embodiment, for example, stored data for each responding EPC Gen 2™ RFID tag can be read at only an initial (i.e., the first) power level at which the RFID tag responds to the interrogation signal.

FIG. 5 is a flow diagram 500 illustrating a method performed by an RFID reader in accordance with another embodiment of the present disclosure. Method 500, in one illustrative implementation, operates a system similar to that shown in FIG. 1 in a read zone environment similar to that shown in FIG. 2. Method 500 starts (502) either during a wake up time period, a reset or another initiation sequence. Operation proceeds to 504, wherein the power level used by an RFID reader 210 is set to a lowest of multiple power levels that are available in the current configuration. The RFID tags that are sufficiently close to the RFID reader 210 can communicate with the RFID reader at this power level.

Operation proceeds to 506, which creates a storage mechanism that contains an empty tag list. The empty tag list may be formed by either initializing a currently existing list in a storage space to be empty (null) or by creating a new storage area that is empty, such as a buffer or the like, to be used as storage for a tag list. At 508, processing causes an interrogation signal to be sent from the RFID reader at the current power level setting of the multiple power levels. Any RFID tags that are within range of the RFID reader operating at the current power level respond to the interrogation signal.

At 510, responses from RFID tags to the transmission of the interrogation signal are detected. Processing then proceeds to 512 which places those RFID tags that have responded into the tag list. At 514, the RFID reader determines whether any of the RFID tags that were added to the tag list are "new" to the tag list (i.e., newly identified tags). As used herein, a new or newly identified tag means a tag that has not previously responded to an interrogation signal transmitted at any power level. If new tags were added to the tag list, processing returns to 508 to transmit another interrogation signal at the same power level and check for newly identified tags.

If at 514 no new tags are identified, the RFID reader determines at 516, whether the interrogation signal was transmitted at the highest power level. If the current power level at which the interrogation signal was transmitted is not the highest of the multiple power levels, the RFID reader, at 518, adjusts the power level that is used to transmit interrogation signals to the next highest of the multiple power levels. Processing then returns to 508, wherein the above-described process repeats until it is determined that the interrogation signal was transmitted at the highest transmission power level, wherein the process ends, at 520.

In this embodiment, the method performed by the RFID reader includes maintaining an identity of the RFID tags responding to the interrogation signal at each of the plurality of power levels and reading the stored data contained in the data signal received from newly identified RFID tags. The RFID reader, thus, tracks the RFID tags that have responded to the transmission of the interrogation signal, wherein tracking comprises increasing the power level used to transmit the interrogation signal when there is an absence of newly identified RFID tags responding to the interrogation signal or when there is an absence of data signals received in response to the interrogation signal for a current power level. Moreover, in this embodiment, the RFID reader selectively reading RFID tags comprises terminating reading when there is an absence of newly identified RFID tags responding to the interrogation signal and the interrogation signal has been transmitted at the highest of the plurality of the power levels.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and apparatus for selectively reading radio frequency identification device (RFID) tags by an RFID reader as described herein. The non-processor circuits may include, but are not limited to, a radio receiver, a radio transmitter, signal drivers, clock circuits, power source circuits, and user input devices. As such, these functions may be interpreted as steps of a method to perform the selectively reading of radio frequency identification device (RFID) tags by an RFID reader as described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Both the state machine and ASIC are considered herein as a "processing device" for purposes of the foregoing discussion and claim language.

Moreover, an embodiment can be implemented as a non-transient computer-readable storage medium (i.e., element) having computer readable code stored thereon for programming a computer (e.g., comprising a processing device and interchangeably referred to herein as a processing device) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

I claim:

1. A method for selectively reading radio frequency identification device (RFID) tags by an RFID reader, the method comprising:
    transmitting, by the RFID reader, an interrogation signal at each of a plurality of incremental power levels beginning with a lowest power level;
    receiving, in response to transmitting the interrogation signal for at least one of the power levels, at least one data signal from each RFID tag within a read zone of the RFID reader, wherein each of the data signals contains stored data corresponding to an identifier of the RFID tag responding to the transmission of the interrogation signal;
    selectively reading the stored data contained in the data signals received from the responding RFID tags;
    increasing power level of the transmitted interrogation signal, to no more than a highest power level, only if:
        (a) there is an absence of newly identified RFID tags responding to a last interrogation signal for a current power level, or
        (b) when there is an absence of data signals received in response to the last interrogation signal for a current power level,
        wherein power incrementing is terminated if conditions (a) or (b) have not been met and otherwise;
    returning to the receiving step if a highest power level has not been achieved.

2. The method of claim 1, wherein selectively reading comprises reading the stored data for each of the responding RFID tags at only one of the power levels at which the interrogation signal is transmitted.

3. The method of claim 1, further comprises terminating reading if there is an absence of newly identified RFID tags responding to the interrogation signal and the interrogation signal has been transmitted at the highest of the plurality of the power levels.

4. The method of claim 2, wherein the stored data for each of the RFID tags is read only at an initial power level to which the RFID tag responds.

5. The method of claim 2 further comprising:
    at each power level at which the interrogation signal is transmitted;
    maintaining an identity of the RFID tags responding to the interrogation signal at the power level; and
    reading the stored data contained in the data signal received from newly identified RFID tags.

6. The method of claim 1, wherein, for each of the responding RFID tags, the data signal is received in response to the interrogation signal at only one of the power levels, and selectively reading comprises reading the stored data from all of the responding RFID tags.

7. The method of claim 2 further comprising instructing each of the RFID tags to respond to the interrogation signal only once.

8. The method of claim 7, wherein the instructing comprises, for each of the RFID tags:
    commanding the RFID tag to set an internal flag to control the RFID tag to respond to the interrogation signal with the data signal only once.

9. A radio frequency identification (RFID) tag reader comprising:
    a transceiver configured to transmit an interrogation signal at each of a plurality of incremental transmission power levels, beginning with a lowest power level, and to receive responses from RFID tags in response to the interrogation signal; and
    a processor operatively coupled to the transceiver and configured to determine the transmission power level and selectively read the stored data contained in the received responses by performing a read algorithm at each transmission power level, wherein the transmission power level is sequentially increased incrementally to a next highest power level only if:
        (a) there is an absence of newly identified RFID tags responding to a last interrogation signal for a current power level, or
        (b) when there is an absence of data signals received in response to the last interrogation signal for a current power level,
        wherein power incrementing is terminated if conditions (a) or (b) have not been met and otherwise; returning to the receiving step if a highest power level has not been achieved.

10. The RFID reader of claim 9, wherein the processor is further configured to control each of the RFID tags to set an internal flag that causes the RFID tags to respond only once to the interrogation signal.

11. A non-transient computer readable storage medium having computer-readable code stored thereon for programming a computer to perform a method for selectively reading radio frequency identification (RFID) tags, the method comprising:
    transmitting an interrogation signal at each of a plurality of incremental power levels beginning with a lowest power level;
    receiving, in response to transmitting the interrogation signal for at least one of the power levels, at least one data signal from each RFID tag within a read zone of an RFID reader, wherein each of the data signals contain stored data corresponding to an identifier of the RFID tag responding to the transmission of the interrogation signal;
    selectively reading the stored data contained in the data signals received from the responding RFID tags;

increasing power level of the transmitted interrogation signal, to no more than a highest power level, only if:
(a) there is an absence of newly identified RFID tags responding to a last interrogation signal for a current power level, or
(b) when there is an absence of data signals received in response to the last interrogation signal for a current power level,
wherein power incrementing is terminated if conditions (a) or (b) have not been met and otherwise;
returning to the receiving step if a highest power level has not been achieved.

12. The non-transient storage medium of claim 11, the method further comprising commanding each of the RFID tags to set an internal flag to control responsiveness of the RFID tag to the interrogation signal.

13. The non-transient storage medium of claim 12, wherein the internal flag causes each of the RFID tags to respond to the interrogation signal with the data signal only once.

14. The non-transient storage medium of claim 11, the method further comprising maintaining an identity of the RFID tags responding to the interrogation signal at each of the power levels and reading the stored data contained in the data signal received from newly identified RFID tags.

15. The non-transient storage medium of claim 11, further comprises terminating reading when there is an absence of newly identified RFID tags responding to the interrogation signal and the interrogation signal has been transmitted at the highest of the plurality of the power levels.

16. The non-transient storage medium of claim 11, wherein the stored data for each of the RFID tags is read only at an initial power level to which the RFID tag responds.

* * * * *